G. P. MARKWARDT.
VEHICLE SPRING JACK.
APPLICATION FILED APR. 20, 1916. RENEWED JULY 19, 1917.
1,239,499.
Patented Sept. 11, 1917.
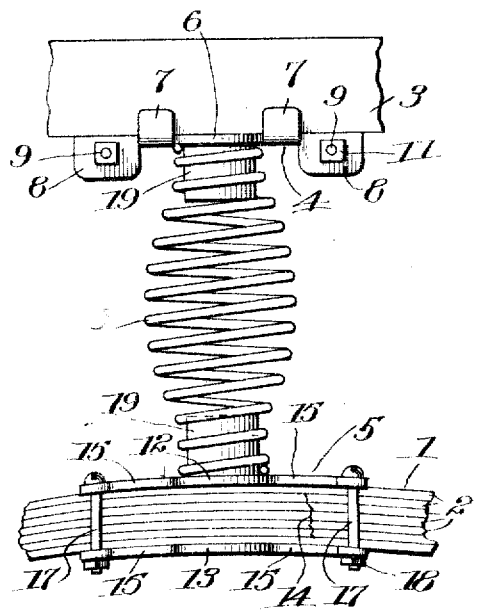
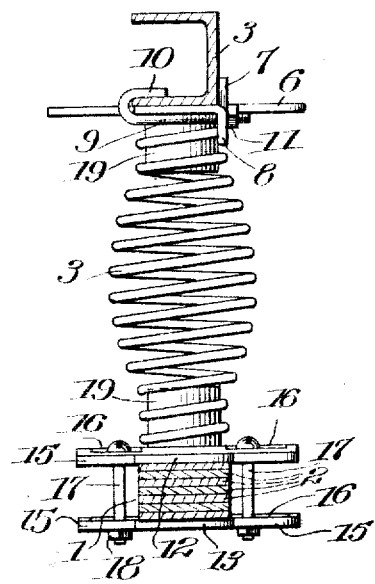
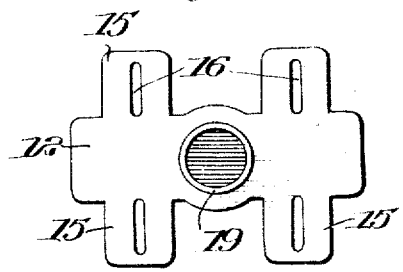
Inventor,
G. P. Markwardt,
By Frank Filley
Attorney.

UNITED STATES PATENT OFFICE.

GUSTAVE P. MARKWARDT, OF WINONA, MINNESOTA.

VEHICLE-SPRING JACK.

1,239,499.  Specification of Letters Patent.  Patented Sept. 11, 1917.

Application filed April 20, 1916, Serial No. 92,439. Renewed July 19, 1917. Serial No. 181,662.

*To all whom it may concern:*

Be it known that I, GUSTAVE P. MARKWARDT, a citizen of the United States, residing at Winona, in the county of Winona and State of Minnesota, have invented certain new and useful Improvements in Vehicle-Spring Jacks, of which the following is a specification.

My invention relates to an emergency or repairing jack for the laminated bolster springs of automobiles or other vehicles.

The main object is to provide a novel, simple, efficient and durable article to accomplish the purpose stated and at the same time one of such a construction that it may be interposed intermediate the spring and side beam of a chassis of an automobile; one having anchor plates with stubs to extend interiorly of the spring to enable mounting of the spring after anchoring of the anchor plates; one having anchor means engaging the spring and capable of adjustment to facilitate attachment to different widths of springs; one having abutment lugs to engage a side beam of a chassis, depending lugs, and hook bolts capable of engagement with the said side beam and being mounted by and fastened to the depending lugs.

With the above and other objects, such as will hereinafter appear, in view, the invention has been embodied in one preferred form as hereinafter described and illustrated in accompanying drawings, wherein:—

Figure 1 is a view illustrating my invention in side elevation and in connection with fragments of an automobile bolster spring and side beam of an automobile chassis; Fig. 2 is an end view of my improvements in connection with the fragments of Fig. 1 which are shown in cross section, and Fig. 3 is a plan view of one of the anchor plates secured to the bolster spring.

Referring specifically to the drawings, 1 designates the upper section or top of an elliptic automobile or other vehicle bolster spring composed of a plurality of laminated leaves 2, as usual. Disposed over the spring 1 and spaced therefrom, is the usual side beam 3 of the automobile chassis. As is well known, one or more of the leaves 2 often break in practice, resulting in the weakening and reduction of efficiency of the bolster spring. It is with a view to strengthening the spring or repairing it under the last mentioned condition, that the present invention has been devised.

Essentially my improvements comprise a compression spring 3, an anchor device 4 and an anchor device 5. Spring 3 may be of any preferred construction and tension, but preferably is enlarged intermediate its ends as shown to minimize the chances of buckling.

The device 4 may comprise a plate 6 adapted to engage the under surface of beam 3 and have one or more lugs 7, integral therewith, to overlap the beam. Also said plate 6 preferably has a plurality of downwardly extending lugs 8 which mount bolts 9 having hooks 10 to overlap the lower flange of beam 3 and adapted to be fastened through the medium of nuts 11 ridable on screw threads of the bolt.

As to device 5, it may comprise anchor plates 12 and 13 to respectively engage the upper and lower faces of spring section 1 and to preferably overlap the spring leaves 2 where broken, as suggested at 14. Plates 12 and 13 have laterally extending leaves 15 each of which is provided with a transversely elongated slot 16. Slots 16 of plates 12 and 13 are adapted to register and receive fastening bolts 17 which, by means of nuts 18, are clamped to the spring section 1. Due to the elongation of slots 16, the plates 12 and 13 may be fastened to spring sections of different widths.

Extending from the plates 6 and 12, toward each other, intermediate the spring section 1 and beam 3, are studs or thimbles 19, integral with the respective plates and being preferably hollow so as to be of minimum weight.

In use, should one or more of the leaves of a spring section like that represented at 1 break, plates 12 and 13 may be brought in overlapping relation with respect to the break and then clamped in place by the bolts 17. Thereafter, plate 6 is secured to the beam 3 with lugs 7 abutting the beam on one side and the hooks 10 engaging it on the other and being fastened by the nuts 11. The thimbles 19 are in alinement and after compressing the spring 3, it may be positioned and permitted to expand so as to surround the thimbles. This spring is preferably tensioned to a considerable degree so as to absorb shocks.

Primarily the invention serves as a repair device for a broken or weakened laminated spring structure. However, at the same time, it serves as a bolster for the chassis.

Since merely the preferred embodiment has been illustrated and described, it is to be understood that changes in the details of construction may be resorted to within the spirit and scope of the appended claims.

I claim:

1. In combination with a supporting spring and body of a vehicle, an auxiliary spring interposed therebetween, an anchor plate for said spring, a lug on said plate to overlap one of said members, a second lug on said plate, a hook bolt engaging the last mentioned member, being mounted in the second mentioned lug.

2. In combination with a supporting spring and a body of a vehicle, an anchor plate associated with one of said members, lugs integral with said plate and abutting the last mentioned member, integral lugs on said plate extending in the opposite direction to said lugs, hook bolts engaging the last mentioned member, mounted in the second mentioned lugs, and a stud extending from said plate into said spring.

3. In combination with a supporting spring and the body of a vehicle, an anchor plate associated with one of said members, a stud extending from said anchor plate, an auxiliary spring into which said stud extends interposed intermediate the supporting spring and body, said plate having laterally elongated slots to accommodate connection to parts varying in size, and fastening means extending through said slots.

4. In combination with a supporting spring and a body of a vehicle, an anchor plate associated with one of said members, lugs integral with said plate and abutting the last mentioned member, integral lugs on said plate extending in the opposite direction to said lugs, hook bolts engaging the last mentioned member, mounted in the second mentioned lugs, and a stud extending from said plate into said spring, an anchor plate in engagement with the spring, a stud rising from said plate and extending into the auxiliary spring, said anchor plate having elongated slots to facilitate attachment to parts varying in size, and fastening means extending through said slots.

In testimony whereof I affix my signature in the presence of two witnesses.

GUSTAVE P. MARKWARDT.

Witnesses:
  EDWARD LEES,
  GERTRUDE E. BROWN.